United States Patent [19]

Singh

[11] 4,234,969
[45] Nov. 18, 1980

[54] BIDIRECTIONAL OPTICAL COUPLER FOR A DATA PROCESSING SYSTEM

[75] Inventor: Amar J. Singh, Escondido, Calif.

[73] Assignee: NCR Corporation, Dayton, Ohio

[21] Appl. No.: 939,727

[22] Filed: Sep. 5, 1978

[51] Int. Cl.³ .................... H04B 9/00; G02B 5/172
[52] U.S. Cl. ........................ 455/607; 350/96.16
[58] Field of Search ... 364/200, MS File, 900 MS File; 250/199; 324/96, 97; 358/901; 350/96.15, 96.16, 96.1, 96.17, 96.2, 96.23, 96.3, 96.11; 455/606, 607

[56] References Cited

U.S. PATENT DOCUMENTS

| | | | |
|---|---|---|---|
| 3,870,396 | 3/1975 | Racki et al. | 350/96.16 |
| 4,027,153 | 5/1977 | Käch | 250/199 |
| 4,061,577 | 12/1977 | Bell | 250/199 |
| 4,089,584 | 5/1978 | Polczynski | 250/199 X |
| 4,090,067 | 5/1978 | Bell, III et al. | 250/199 |
| 4,107,518 | 8/1978 | McMahon | 250/199 |
| 4,112,293 | 9/1978 | Käch | 250/199 |
| 4,161,650 | 7/1979 | Caouette et al. | 250/199 |
| 4,161,651 | 7/1979 | Sano et al. | 250/199 |

OTHER PUBLICATIONS

Rawson and Metcalfe—"Fibernet:Multimode Optical Fibers for Local Computer Networks"—IEEE Transactions on Communications, vol. Com-26, No. 7, Jul. 1978—pp. 983–990.

*Primary Examiner*—Joseph F. Ruggiero
*Attorney, Agent, or Firm*—J. T. Cavender; Edward Dugas; Stephen F. Jewett

[57] ABSTRACT

A data processing system having a plurality of stations and an optical transmission bus linking the stations. The bus includes two transmission lines carrying optical signals in opposite directions so that two stations may communicate simultaneously. A passive optical coupler module couples each station to the two transmission lines. The optical coupler module includes a silicon substrate having suitably formed grooves and recesses for mounting single fiber waveguide segments, tapered waveguides, each for directing the optical signal on either of two waveguide segments to a single optical path, and optical beam splitters, each for splitting a portion of the optical signal on a waveguide segment for each of two other waveguide segments.

8 Claims, 3 Drawing Figures

BIDIRECTIONAL OPTICAL COUPLER FOR A DATA PROCESSING SYSTEM

BACKGROUND OF THE INVENTION

The present invention relates to optically linked data processing systems, and more particularly, to optical couplers used with optical transmission lines in such data processing systems.

In data processing systems, fiber-optic transmission of data offers many advantages over conventional forms of data transmission. For example, signals carried over fiber-optic cables are generally not affected by electromagnetic or radio frequency interference. Also, fiber-optic cables do not spark or short circuit, and are capable of eliminating ground loop problems by providing electrical isolation between optically connected equipment.

In the past, each optical transmission line in a data processing system generally consisted of a bundle of optical fibers. A single bundle interconnected the various stations within the system and each fiber within the bundle carried the same signal. Optical couplers for connecting stations to bundles of fibers in such systems are known and have been disclosed, for example, in U.S. Pat. No. 4,072,399, issued to R. E. Love, et al.

One problem associated with present and proposed optical transmission lines and couplers is that they are not generally acceptable in a data processing system, such as a multiprocessor system, where it may be desirable for two or more stations to communicate with each other simultaneously. In such a system, the simultaneous transmission of two messages over a single optical transmission line makes it difficult for a station to detect either message. Furthermore, a single optical transmission line for carrying messages in either direction will often experience significant signal losses at couplers and other connection points along the line.

With the advance of fiber-optic technology to the point of making single fiber connections readily available and inexpensive, there has arisen the need for data processing systems having single fiber transmission lines and reliable, yet inexpensive, coupler modules for coupling stations to such transmission lines.

SUMMARY OF THE INVENTION

In accordance with the present invention, a data processing system includes a plurality of stations and optical transmission means interconnecting the stations. The transmission means includes a bus having first and second transmission lines for carrying data in opposite directions, and a coupler module for coupling the first and second transmission lines to each of the stations. A third transmission line associated with each station carries optical signals from an optical source in the station and a fourth transmission line associated with each station carries optical signals to an optical detector in the station.

The coupler module includes means for directing portions of the signals from the third transmission line to each of the first and second transmission lines and for directing portions of the signals from the first and second transmission lines to the fourth transmission line. The means for directing includes optical beam splitters, such as partially reflecting elements, for splitting the portions of signals on the first, second and fourth transmission lines, and optical waveguide means, such as tapered waveguides, for directing the portions of the signals from the first and second transmission lines into a single path for the fourth transmission line, and for directing the portions of the signal from the third transmission line into a single path with the signal on the first transmission line and a single path with the signal on the second transmission line.

With bidirectional transmission means accomplished by the first and second transmission lines carrying signals in opposite directions, the system in accordance with the present invention may be open-ended. Accordingly, additional coupler modules and stations may be added if needed. Furthermore, the first and second transmission lines permit two stations to communicate with each other simultaneously.

It is therefore an object of the present invention to provide an improved data processing system.

It is a further object of the present invention to provide such a system where at least two stations may communicate with each other simultaneously.

It is still a further object of the present invention to provide an improved coupler module for coupling stations to optical transmission lines in a data processing system.

Still a further object of the present invention is to provide an optical coupler module for use with two optical transmission lines carrying signals in opposite directions.

Still a further object of the present invention is to provide an inexpensive, reliable optical coupler module for use with single optical fiber transmission lines in a data processing system.

These and other objects and advantages will become more apparent from the following description taken in conjunction with the accompanying drawings.

DESCRIPTION OF THE PREFERRED EMBODIMENT

Figure 1:
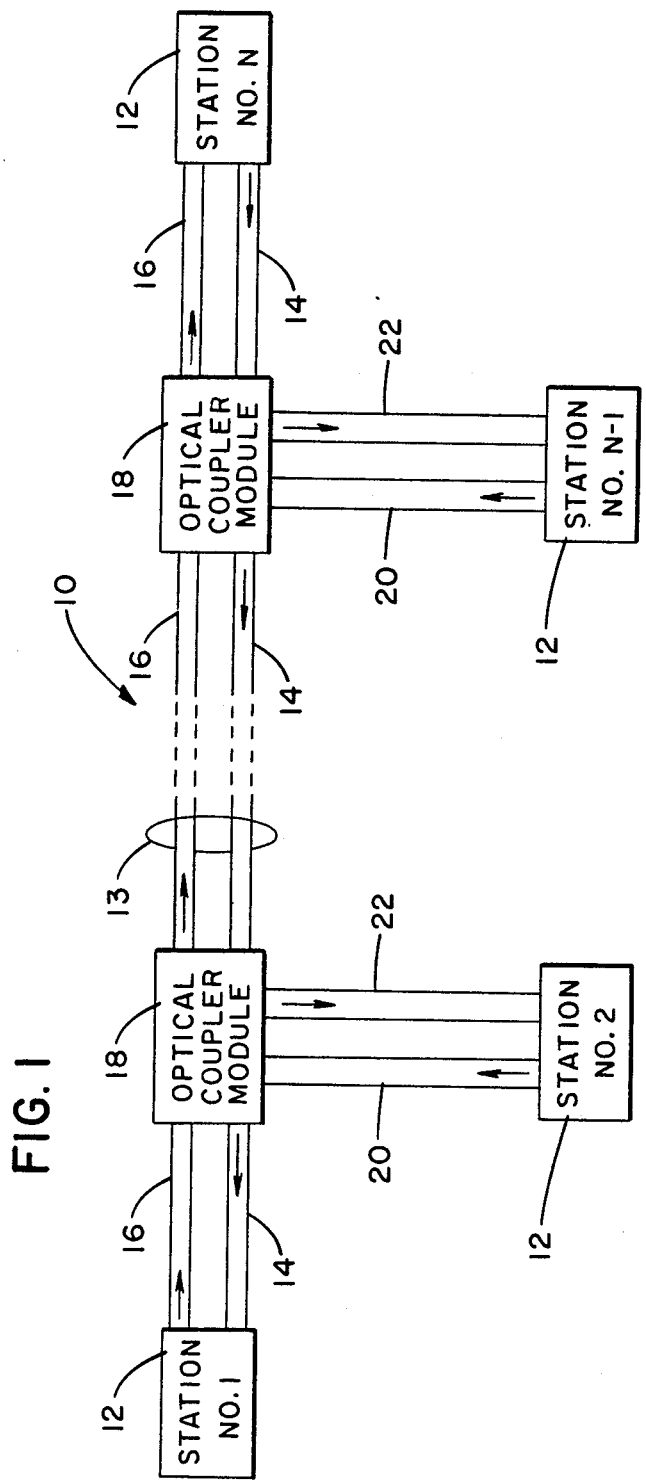
FIG. 1 is a block diagram of a data processing system in accordance with the present invention.

Referring now to FIG. 1, there is shown a data processing system 10 that includes a plurality of stations 12, a bidirectional bus 13 comprised of optical transmission lines 14 and 16, and a plurality of passive, optical coupler modules 18 for coupling each station 12 to each of the transmission lines 14 and 16.

The bidirectional bus 13 is open-ended and is a line data bus rather than a closed loop data bus. As indicated by the arrows in FIG. 1, the transmission lines 14 and 16 transmit data, in the form of optical signals, in opposite directions, with the data on transmission line 14 flowing toward the left as viewed in FIG. 1, and the data on transmission line 16 flowing toward the right. The transmission lines 14 and 16 are conventional, single optical fibers.

The stations 12 are numbered 1 through N in FIG. 1, and represent a variety of data processing equipment. For example, in a multiprocessor system, at least several of the stations will have processing capability. In addition, the stations 12 could represent various peripherals devices such as card readers, magnetic disc and tape units, operator panels, CRT displays, and the like. In order to transmit and receive optical signals, it is necessary that each station 12 have an optical signal source for generating optical signals and an optical signal detector for receiving optical signals.

The optical coupler modules 18 will be more fully described in connection with the description of FIG. 2. Briefly, however, the coupler modules 18 serve to couple each of the stations 12 to the transmission lines 14 and 16. Each coupler module is capable of receiving an optical signal from a transmission line 20 from one of the stations 12, and sending the signal in both directions along the transmission lines 14 and 16. Each coupler module 18 is also capable of receiving an optical signal on each of the lines 14 and 16 and splitting off and directing a portion of each signal to a transmission line 22 leading to one of the stations 12.

It can be seen from the system as illustrated in FIG. 1 that two stations may simultaneously communicate with each other over the transmission lines 14 and 16. As an example of how this might occur, assume that station No. 2 includes a processing device and that it has a data word for which it desires a byte parity check. Also assume that station No. N-1 is a byte parity checking device capable of serially receiving the transmission of each byte of the data word from station No. 2 and generating after receipt of each byte a signal indicating whether a byte parity error has occurred. The system 10 in FIG. 1 permits error signals to be returned to the processor in station No. 2 without waiting for the transmission lines to be cleared of all the data bytes being transmitted to station No. N-1.

Of course, the above is a simplified example of one operation where two stations may communicate simultaneously and thereby minimize the transmission delays associated with the operation. In a typical distributed processing system, where many of the stations will have processing capabilities, there will be a large number of operations where two stations may efficiently communicate with each other simultaneously.

It is noteworthy that the number of the coupler modules 18 in FIG. 1 is lower than the number of stations 12, and that where there are N stations as illustrated in FIG. 1, there will be N-2 coupler modules. For reasons which should become apparent later, the stations at each end of bus 13, station Nos. 1 and N, may each be coupled to the transmission lines 14 and 16 without each having a separate coupler module.

Figure 2:
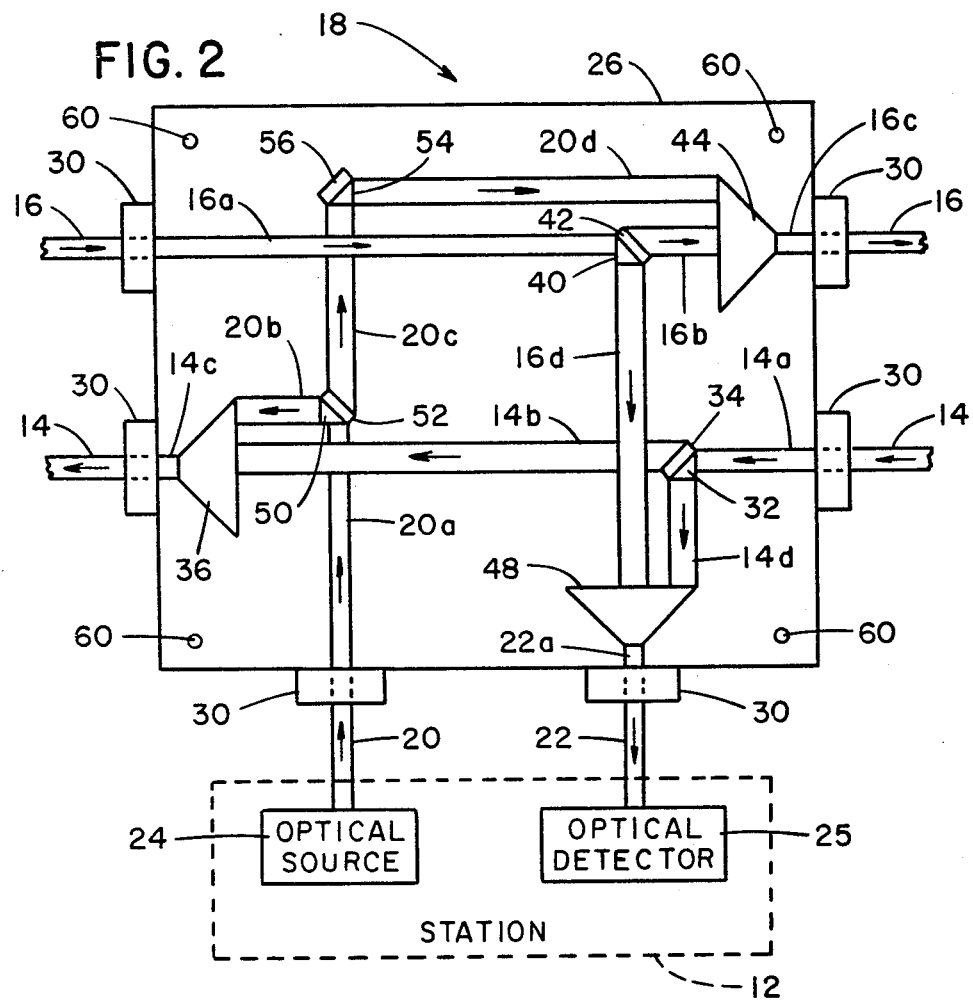
FIG. 2 is a planar view of an optical coupler module, and illustrates the manner in which the optical coupler module couples a station to two transmission lines in accordance with the present invention.

In FIG. 2 there is illustrated in detail the components of one of the coupler modules 18 and the connection of that optical coupler 18 to one of the stations 12. The illustrated station 12 includes an optical source 24 for generating optical signals and an optical detector 25 for receiving optical signals and converting them into electrical signals usable by the station.

The coupler module 18 in FIG. 2 is mounted on a substrate 26, such as silicon, which may be lithographically etched or otherwise formed with grooves and recesses for holding various components of the coupler module. Each of the transmission lines 14, 16, 20 and 22 are connected to the coupler module 18 by an optical connector 30. The connectors 30 may be conventional single-fiber connectors, such as the 905 and 906 series of optical connectors sold under the trademark AMPHENOL by Bunker Ramo Corporation, of Danbury, Conn. The connectors optically link, with minimal signal losses, the transmission lines 14, 16, 20 and 22 with single-fiber, optical waveguide segments (to be described shortly) within the coupler module 18.

The signals on transmission line 14 are passed through the coupler module by an optical waveguide segment 14a, a prism interface 32, an optical beam splitter 34, a waveguide segment 14b, a tapered optical waveguide 36 and a waveguide segment 14c. Likewise, the signals on the transmission line 16 are passed through the coupler module by an optical waveguide segment 16a, a prism interface 40, an optical beam splitter 42, a waveguide segment 16b, a tapered optical waveguide 44 and a waveguide segment 16c. A portion of the signal from transmission line 14 is deflected by optical beam splitter 34 and passes along a waveguide segment 14d to a tapered optical waveguide 48. A portion of the signal on the transmission line 16 is similarly deflected by the optical beam splitter 42 and passes along a waveguide segment 16d also to the tapered waveguide 48. The tapered waveguide 48 directs whatever signals are present on either of the waveguide segments 14d and 16d to a waveguide segment 22a, which is connected by one of the connectors 30 and by the transmission line 22 to the optical detector 25 in station 12.

The signal generated by the optical source 24 in station 12 is carried along the transmission line 20 which is connected by one of the connectors 30 to a waveguide segment 20a. This signal on waveguide segment 20a is passed through a prism interface 50 and is split by an optical beam splitter 52 with one portion of the signal reflected and passing along a waveguide segment 20b to the tapered waveguide 36. A second portion of the signal split by optical beam splitter 52 passes through the optical beam splitter 52 and along a waveguide segment 20c, through a prism interface 54 and is reflected by a reflector 56 and passed along a waveguide segment 20d to the tapered waveguide 44. The tapered waveguide 44 directs any signal on either of waveguide segments 20d and 16b to the waveguide segment 16c.

As noted earlier, the substrate 26 is suitably formed with grooves and recesses for receiving the components of the coupler module. The shapes of the grooves and recesses generally correspond to the shapes of the waveguide segments, optical beam splitters, tapered waveguides and prism interfaces as illustrated in FIG. 2. It should be noted that the groove for receiving the waveguide segments will vary in depth since, as illustrated, segment 16a will pass over segment 20c, segment 16d will pass over segment 14b, and segment 14b will pass over segment 20a. Each of the components received in the substrate 26 is located far enough into its correspondingly shaped groove or recess so that a suitable cover plate (not shown) or the like may be fastened at apertures 60 to enclose the coupler module 18.

The waveguide segments 14a through 14d, 16a through 16d, 20a through 20d, and 22a used in the coupler module 18 are each a suitable single optical fiber having a transparent core and a surrounding cladding, such as one of the single optical fibers available from the Fiberoptics Division of Valtec Corporation, West Boylston, Maine. The optical beam splitters 34, 42 and 52 are partially reflecting elements made, for example, from a high purity glass, such as crown glass, having a reflective coating of suitable density to cause partial reflection and partial passing of optical signals as described earlier. The reflector 56 may also be made of crown glass and has a reflective coating of relatively high density to cause reflection of the entire optical signal as also described earlier. The tapered optical waveguides 36, 44 and 48 are made of crown glass and have the shape of truncated cones. The conical surface of the tapered waveguides has a reflective coating so that any optical signals presented at the larger end face of the tapered waveguide are directed toward a single optical path defined by the smaller end face, thus enabling the tapered waveguide to direct a signal from either of two waveguide segments to a third waveguide segment, as described earlier. Although not illustrated as such in FIG. 2, in order to minimize signal losses it is preferable that the larger end face of each of the tapered waveguides have an area as close as possible to the total area of the end faces of the waveguide segments from which it receives signals, and that the smaller end face of each of the tapered waveguides have an area as close as possible to the area of the end face of the waveguide segment to which it passes signals.

Figure 3:
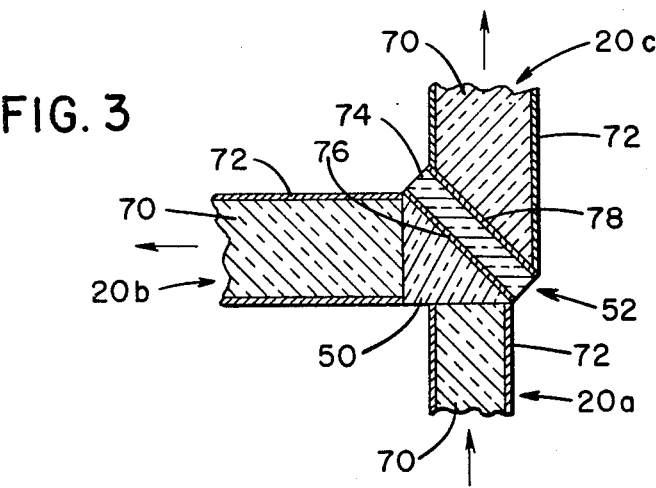
FIG. 3 is an enlarged sectional view illustrating an optical beam splitter used in the coupler module of FIG. 2.

FIG. 3 shows an enlarged view of the optical beam splitter 52, its associated prism interface 50, and portions of the waveguide segments 20a, 20b and 20c. The waveguide segments 20a, 20b and 20c each have a transparent core 70 and a reflective cladding or coating 72. To minimize optical losses, the end faces of the waveguide segments 20a and 20b in FIG. 3 are normal to their central axes and the prism interface 50 fills the spaced between the waveguide segments 20a and 20b and the optical beam splitter 52. The prism interface 50 has the shape of a triangular solid and has the same index of refraction as the cores 70 of the waveguide segments 20a, 20b and 20c. Index matching fluid may optionally be placed between the surfaces of the prism interface 50, the waveguide segments and the optical beam splitter 52.

The optical beam splitter 52 includes a glass body 74 with a reflective coating 76, such as silver fluoride, on the side facing the prism interface 50, and an anti-reflective coating 78, such as magnesium fluoride, on the side facing the waveguide segment 20c. Since the optical beam splitter 52 will tend to distribute light across its entire end face adjacent waveguide segment 20c, the diameter of waveguide segment 20c is larger than the other waveguide segments 20a and 20b in order to capture as much of the passed optical signal as possible.

It can thus be seen from the above that the coupler module 18 provides a means for connecting each of the stations 12 to a data processing system where two optical transmission lines carry signals in opposite directions so that two stations in the system may communicate with each other simultaneously. It should be appreciated that the number of stations which can communicate simultaneously can be increased by increasing the number of transmission lines. In such a case, each coupler module would need to be modified so that it passes to its coupled station the signals on each of the transmission lines and directs a portion of the optical signal from the optical source in its coupled station to each of the transmission lines.

Although a presently preferred embodiment of the invention has been described, it should be understood that various changes may be made within the scope of the appended claims.

What is claimed is:

1. In a data processing system having a plurality of stations and optical transmission means interconnecting the stations, the improvement wherein the optical transmission means comprises:

a data bus, including first transmission line means for carrying an optical signal in one direction and second transmission line means for carrying an optical signal in a second opposite direction simultaneously so that two of the stations may communicate with each other simultaneously over said first and said second transmission line means;

third transmission line means associated with each one of the stations for receiving an optical signal from an optical source in the station;

fourth transmission line means associated with each one of the stations for carrying an optical signal to an optical detector in the station; and an optical coupler module for coupling each of the stations to said data bus, comprising:

optical beam splitting means associated with each of said first, said second, and said third transmission line means for splitting portions of the optical signals on said first and said second transmission line means for said fourth transmission line means and for splitting portions of the optical signal on said third transmission line means from the optical source for each of said first and said second transmission line means; and optical waveguide means associated with each of said first, said second and said fourth transmission line means, said waveguide means associated with said fourth transmission line means being connected for receiving portions of the optical signals from said first and said second transmission line means and directing the portions of the optical signals from said first and said second transmission line means into a single optical path for said fourth transmission line means to said optical detector, said waveguide means associated with said first transmission line means and associated with said second transmission line means each being connected for receiving portions of the optical signal from said third transmission line means and directing the portion of the optical signal from said third transmission line means into a single optical path for said first transmission line means and a single optical path for said second transmission line means.

2. The data processing system of claim 1, wherein said first, said second, said third and said fourth transmission line means each comprise a single optical fiber.

3. The data processing system of claim 1, wherein each said beam splitting means comprises a partially reflecting element and wherein each said optical waveguide means comprises a tapered waveguide having a large end face and a small end face so that any optical signal presented at the large end face is directed to a single optical path defined by the small end face.

4. The data processing system of claim 3, wherein said optical coupler further comprises a substrate having recesses for receiving each said partially reflecting element and each said tapered waveguide.

5. The data processing system of claim 4, wherein said substrate is comprised of silicon and wherein said recesses are lithographically etched.

6. The data processing system of claim 3, wherein said optical coupler further comprises waveguide segments connected to said first, said second, said third and said fourth transmission line means and to said partially reflecting element and said tapered waveguide for passing the optical signals to and receiving the optical signals from each said partially reflecting element and each said tapered waveguide.

7. The data processing system of claim 6, wherein said optical coupler further comprises a substrate having grooves of varying depth for receiving said waveguide segments so that certain of said waveguide segments pass over certain others of said waveguide segments.

8. The data processing system of claim 7, wherein said substrate is comprised of silicon and wherein said grooves are lithographically etched.

* * * * *